United States Patent [19]
Chino

[11] Patent Number: 6,046,863
[45] Date of Patent: Apr. 4, 2000

[54] LENS CONTROL APPARATUS, IMAGE PICKUP APPARATUS, AND LENS CONTROL METHOD

[75] Inventor: Noriko Chino, Kanagawa, Japan

[73] Assignee: Sony Corporation, Tokyo, Japan

[21] Appl. No.: 09/139,707

[22] Filed: Aug. 26, 1998

[30] Foreign Application Priority Data

Aug. 28, 1997 [JP] Japan ................................... 9-232803

[51] Int. Cl.[7] .................................................. G02B 15/14
[52] U.S. Cl. .......................... 359/697; 359/698; 396/241; 396/275; 396/79; 396/85
[58] Field of Search ...................... 359/694, 696, 359/697, 698; 396/241, 275, 79, 81, 85, 80

[56] References Cited

U.S. PATENT DOCUMENTS

| | | | |
|---|---|---|---|
| 3,601,021 | 8/1971 | Easterly | 396/275 |
| 3,987,461 | 10/1976 | Kondo | 396/241 |
| 5,185,669 | 2/1993 | Kato | 359/697 |
| 5,272,567 | 12/1993 | Inoue | 359/698 |
| 5,854,711 | 12/1998 | Kaneda | 359/697 |

*Primary Examiner*—Loha Ben
*Attorney, Agent, or Firm*—Frommer Lawrence & Haug, LLP.; William S. Frommer

[57] ABSTRACT

In a lens control apparatus, the performance does not deteriorate even if a filter is inserted and removed. Correction amounts of a focusing lens position which are necessary to eliminate an out-of-focus that is caused when, for example, a filter is inserted are actually measured at several zooming positions such as zm0, zm1, zm2, and zm3 and the results are stored into a predetermined memory such as an ROM or the like in a CPU 36 with respect to a position control of a lens. A correction amount when the filter is inserted at an arbitrary zooming position is calculated by a polygonal line approximation based on correction amounts at the several zooming positions. By adding this correction amount to the focusing lens position which is calculated in accordance with separately stored zoom tracking curve data when the filter is removed, a correct in-focus state can be obtained even when the filter is inserted.

10 Claims, 4 Drawing Sheets

LENS CONTROL APPARATUS, IMAGE PICKUP APPARATUS, AND LENS CONTROL METHOD

BACKGROUND OF THE INVENTION

1. Field of the Invention

The invention relates to a lens control apparatus, an image pickup apparatus, and a lens control method which are used in, for example, a digital VCR or the like integratedly having an image pickup apparatus.

2. Description of the Related Art

In a zoom lens system of a 4-group inner focusing type which is used in a digital VCR or the like integratedly having an image pickup apparatus, in order to change a magnification of a picture by zooming, namely, by moving a zoom lens (also called a variator) while maintaining an in-focused state, a focusing lens has to be moved along a predetermined locus. Such a locus is called a zoom tracking curve.

The zoom tracking curve usually changes depending on a distance to an object to be photographed. In the actual lens control, therefore, several typical zoom tracking curve data at several kinds of typical distances is stored in predetermined means and, with respect to distances other than the typical distances, a focusing lens position is controlled on the basis of the typical zoom tracking curve data.

For the purpose of further improving a picture quality, adding a new function, or the like, there is a case where a construction to insert and remove a filter into/from an optical path of the zoom lens system of the 4-group inner focusing type is added.

Since the nature as an optical system of a lens system changes by the insertion and removal of the filter due to a factor such that a refractive index of such a filter differs from that of the air or the like, the zoom tracking curve changes. Therefore, if the focusing lens position is controlled on the basis of only either one of the zoom tracking curve data when the filter is removed and the zoom tracking curve data when the filter is inserted, an out-of-focus is caused by the insertion/removal of the filter and a problem such that the tracking performance deteriorates and the performance of the whole lens system deteriorates occurs.

To prevent such a performance deterioration of the lens system, there is considered a method whereby both of the zoom tracking curve data when the filter is removed and the zoom tracking curve data when the filter is inserted are stored and the zoom tracking curve data which is used to calculate the distance by which the focusing lens should be moved is switched in accordance with the insertion and removal of the filter.

According to such a method, however, a point that an ROM (Read Only Memory) of a large memory capacity is necessary since an amount of data to be stored increases, a point that there is a fear such that the reliability of the control deteriorates because an amount of data which is used for a calculating process is extremely large, and the like become problems. Further, there is also a case where the zoom tracking curve when the filter is inserted differs from a result of a simulation which is performed at a design stage because of a factor such as a variation in quality of the filter or the like. In such a case, there is also a fear such that the control of the focusing lens position cannot be performed at an enough high precision under the zoom tracking curve data based on the simulation result in the case where the filter is inserted.

OBJECTS AND SUMMARY OF THE INVENTION

It is, therefore, an object of the invention to provide a lens control apparatus, an image pickup apparatus, and a lens control method in which a deterioration of a performance does not occur even if a filter is inserted and removed.

According to the invention of claim 1, there is provided a lens control apparatus having a focusing lens and a zoom lens and constructed so as to insert and remove a filter into/from an optical path, comprising:

memory means for storing a plurality of zoom tracking curve data for expressing a relation between a zoom lens position and a focusing lens position when an in-focus state is obtained at the zoom lens position in a first state regarding the insertion and removal of the filter;

lens position driving means for driving the zoom lens position and the focusing lens position, respectively; and control means for controlling the lens position driving means so as to eliminate an out-of-focus which is caused when the apparatus is shifted to a second state regarding the insertion and removal of the filter at the focusing lens position which is obtained from the zoom tracking curve data in correspondence to an arbitrary position of the zoom lens.

According to the invention of claim 3, there is provided an image pickup apparatus comprising:

a lens control apparatus having a focusing lens and a zoom lens and constructed so as to insert and remove a filter into/from an optical path, in which the lens control apparatus is constructed by memory means for storing a plurality of zoom tracking curve data for expressing a relation between a zoom lens position and a focusing lens position when an in-focus state is obtained at the zoom lens position in a first state regarding the insertion and removal of the filter, lens position driving means for driving the zoom lens position and the focusing lens position, respectively, and control means for controlling the lens position driving means so as to eliminate an out-of-focus which is caused when the apparatus is shifted to a second state regarding the insertion and removal of the filter at the focusing lens position which is obtained from the zoom tracking curve data in correspondence to an arbitrary position of the zoom lens;

an image pickup device to which light is inputted through the focusing lens and the zoom lens; and signal processing means for executing a signal process to an image pickup output from the image pickup device.

According to the invention of claim 4, there is provided a lens control method in a lens control apparatus having a focusing lens and a zoom lens and constructed so as to insert and remove a filter into/from an optical path, comprising:

a step of storing a plurality of zoom tracking curve data for expressing a relation between a zoom lens position and a focusing lens position when an in-focus state is obtained at the zoom lens position in a first state regarding the insertion and removal of the filter;

a lens position driving step of driving the zoom lens position and the focusing lens position, respectively; and a step of controlling the lens position driving step so as to eliminate an out-of-focus which is caused when the apparatus is shifted to a second state regarding the insertion and removal of the filter at the focusing lens position which is obtained from the zoom tracking curve data in correspondence to an arbitrary position of the zoom lens.

According to the invention as mentioned above, the focusing lens position can be corrected so as to eliminate the out-of-focus which is caused due to the change in nature as an optical system of the lens system by the insertion and removal of the filter whose refractive index or the like differs from that of the air.

The above and other objects and features of the present invention will become apparent from the following detailed description and the appended claims with reference to the accompanying drawings.

DETAILED DESCRIPTION OF THE PREFERRED EMBODIMENT

Figure 1A:
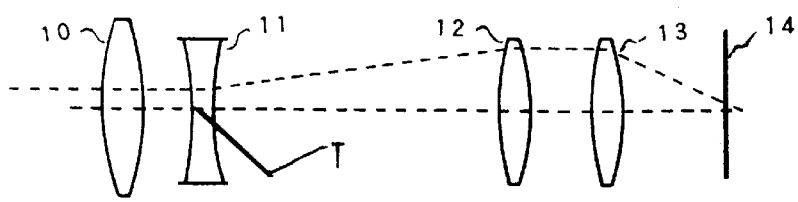
FIGS. 1A and 1B are schematic diagrams for explaining an example of a lens system to which the invention can be applied.
Figure 1B:
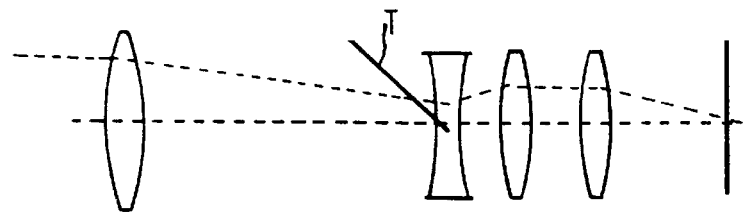

For easy understanding of the invention, an example of a zoom lens system of a 4-group inner focusing type which is generally used will be first described with reference to FIGS. 1A and 1B. Such a zoom lens system of the 4-group inner focusing type has a front lens 10, a zoom lens 11, a master lens 12, and a focusing lens 13 and sets a focal point onto a focusing surface 14, namely, for instance, an image pickup surface of an image pickup device such as a CCD (Charge Coupled Device) or the like. Further, by moving the focusing lens 13 along a predetermined zoom tracking curve in association with the movement of the zoom lens 11, for instance, from the position as shown in FIG. 1A to the position shown in FIG. 1B, a zooming operation is performed, namely, a magnification of a picture can be changed while maintaining a state where a focal point is set to the focusing surface 14.

The zoom tracking curve changes depending on a distance to an object to be photographed. Therefore, although zoom tracking curves of an infinite number theoretically exist in accordance with the distance to the object, the focusing lens position is actually controlled as follows. That is, several kinds of typical distances are set, several typical zoom tracking curve data corresponding to those distances is stored into predetermined memory means, and distances other than the set typical distances can be obtained by a calculation based on the typical zoom tracking curve data.

Figure 2:
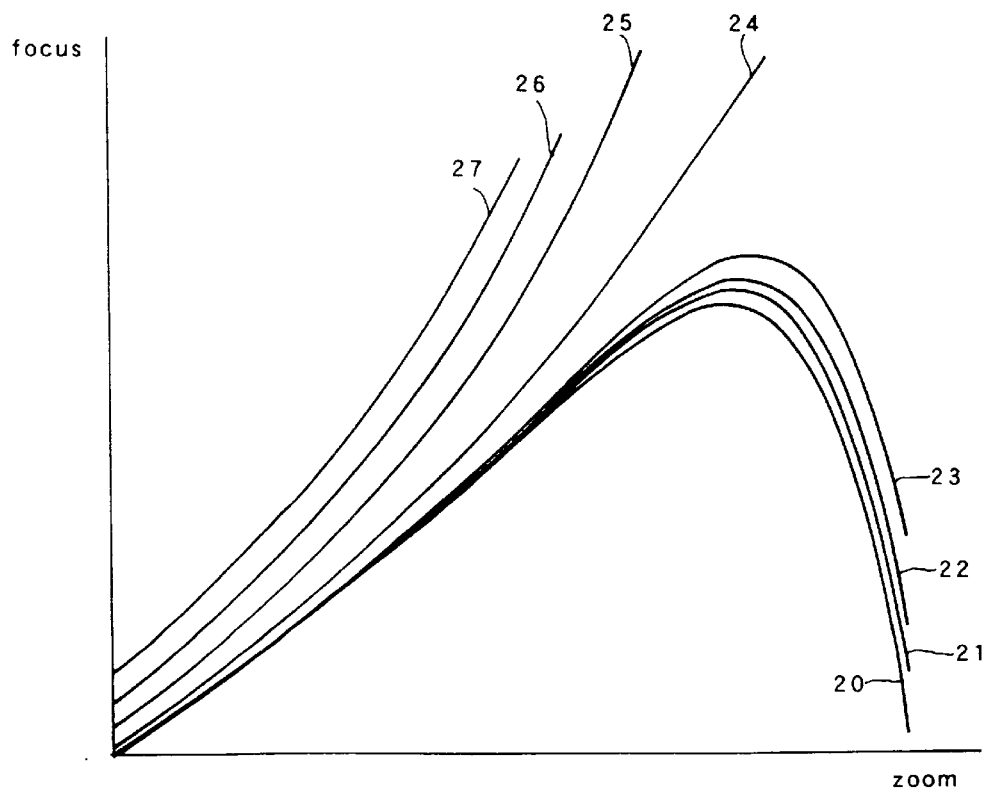
FIG. 2 is a schematic diagram for explaining an example of zoom tracking curves with respect to seven kinds of object distances.

FIG. 2 shows an example of the typical zoom tracking curves. Reference numerals 20, 21, 22, 23, 24, 25, 26, and 27 denote zoom tracking curves when the distance to the object is equal to an infinite distance, 4 m, 2 m, 1 m, 20 cm, 5 cm, 2.2 cm, and 1 cm, respectively. When the object distance differs from those distances, the position of the focusing lens 13 is determined by a calculation based on the data of those eight zoom tracking curves.

Figure 3:
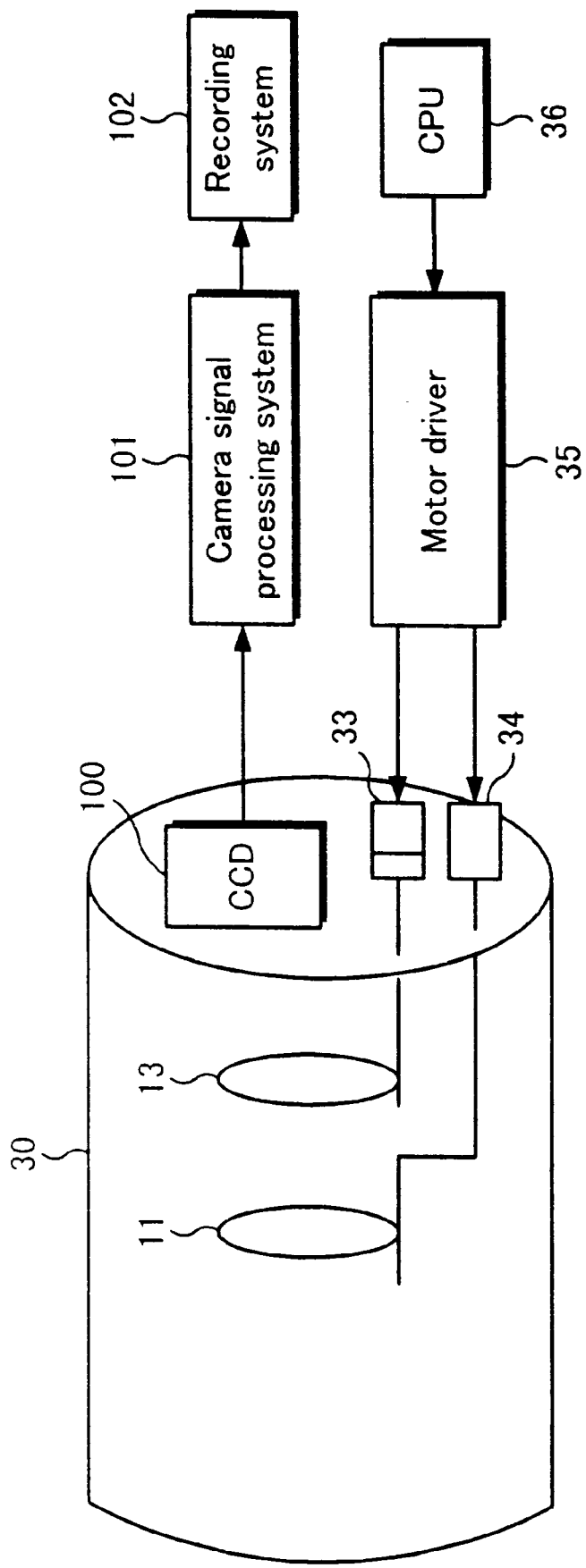
FIG. 3 is a block diagram for explaining an embodiment of the invention.

An embodiment of the invention in case of applying the invention to a digital VCR integratedly having an image pickup apparatus will now be described with reference to FIG. 3. First, as component elements regarding the position control of the focusing lens 13 and zoom lens 11, there are a lens block 30, a focusing motor 33, a zooming motor 34, a motor driver 35, a CPU (microcomputer) 36, and the like.

The CPU 36 sends a command to the motor driver 35 on the basis of zoom movement information which is supplied by the operation of the user or the like. The motor driver 35 drives the zooming motor 34 in accordance with the command, thereby moving the zoom lens 11. Further, the CPU 36 calculates the position where the focusing lens 13 should be moved on the basis of the zoom tracking curve data stored in the ROM or the like and sends a command to the motor driver 35 on the basis of a calculation result. The motor driver 35 drives the zooming motor 34 in response to the command, thereby moving the focusing lens 13.

Further, a CCD 100 serving as an image pickup device converts the light entering through the lens block 30 into an electric signal and supplies the electric signal to a camera signal processing system 101. The camera signal processing system 101 performs a predetermined signal process on the basis of the supplied electric signal and outputs the processed signal to a recording system 102. The recording system 102 converts the received signal into a signal format for recording and records it onto a recording medium such as a magnetic tape or the like by writing means such as a magnetic head or the like.

For the purpose of further improving a picture quality, adding a new function, or the like, there is a case of adding a construction to insert and remove a filter into/from an optical path of the lens system. As such a filter, there is an ND filter to prevent a picture quality deterioration due to a diffraction phenomenon of a diaphragm, an IR cut-off filter (infrared rays cut-off filter) for raising a sensitivity of the lens, or the like.

Figure 4:
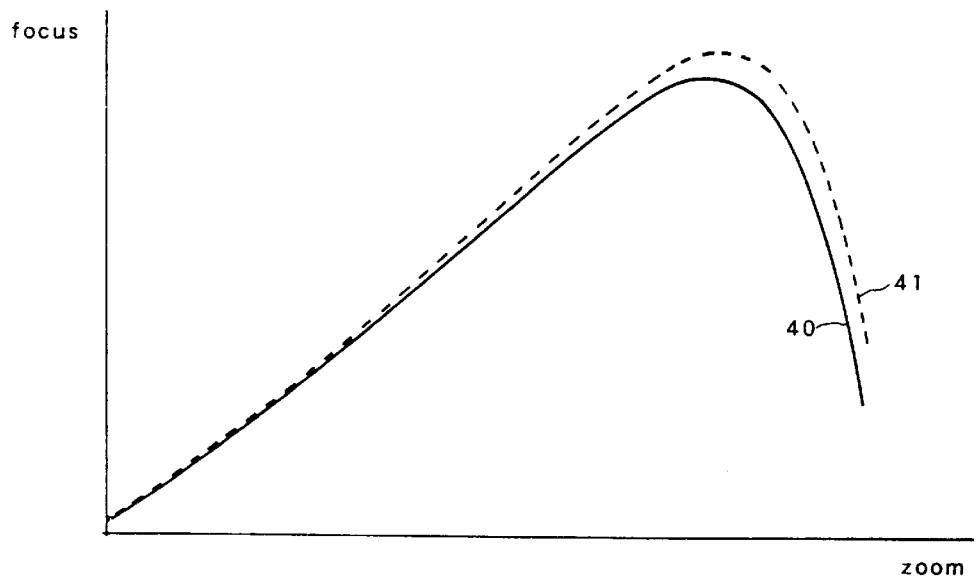
FIG. 4 is a schematic diagram for explaining a change in zoom tracking curve which is caused due to the insertion and removal of a filter.

Due to a factor such that the refractive index of the filter differs from that of the air or the like, since the nature as an optical system of the lens system changes by the insertion and removal of the filter, the zoom tracking curve changes by the insertion and removal of the filter as shown in FIG. 4. In FIG. 4, reference numeral 40 denotes a zoom tracking curve when the filter is removed and 41 indicates a zoom tracking curve when the filter is inserted.

Therefore, if only either one of the zoom tracking curve data when the filter is removed and the zoom tracking curve data when the filter is inserted is stored and the position control of the focusing lens 13 is performed on the basis of the stored data, an out-of-focus occurs due to the insertion and removal of the filter. Due to such an out-of-focus, problems of a deterioration of the tracking precision and, further, a deterioration of the performance of the whole lens system occur.

To cope with the above problem, a method of storing both of the zoom tracking curve data when the filter is removed and the zoom tracking curve data when the filter is inserted is considered. However, if such a method is used, an amount of data of the zoom tracking curve data to be stored increases and a capacity of the memory means has to be increased, so that it becomes a factor of obstructing a miniaturization of a circuit scale and realization of low costs. Since an amount of data which is used for the calculating process is extremely large, there is a fear of deterioration of the control reliability.

Further, the zoom tracking curve data is formed on the basis of, for example, a result of a simulation which is executed at the design stage or the like. If the zoom tracking curve data which is formed by such a method in the filter inserted state is used, in the case where a variation of the filters is large to a certain extent or more, there is a fear that the correct zoom tracking cannot be performed.

In the invention, therefore, for example, the zoom tracking curve data when the filter is removed is stored. On the other hand, a correction amount of the focusing lens position (hereinafter, simply referred to as a focusing position) which is needed to eliminate the out-of-focus that is caused when the filter is inserted is obtained, for example, as an actual measurement value with respect to a predetermined number of zoom lens positions (hereinafter, referred to as zooming positions) and its result is further stored. By a polygonal line approximation based on the above data, a correction amount of the focusing position when the filter is inserted at an arbitrary zooming position (the correction amount of the focusing position is simply referred to as a correction amount in the following explanation) is calculated. By using the calculated correction amount, the focusing position which is obtained on the basis of the stored zoom tracking curve data is corrected, so that the focusing position is controlled so as to obtain an in-focus state even when the filter is inserted.

To avoid complexity of the disclosure, a case of storing the zoom tracking curve data when the filter is removed will now be described hereinbelow. However, the zoom tracking curve data when the filter is inserted can be also stored. In such a case, it is sufficient to calculate a correction amount when the filter is removed by a polygonal line approximation.

Figure 5:
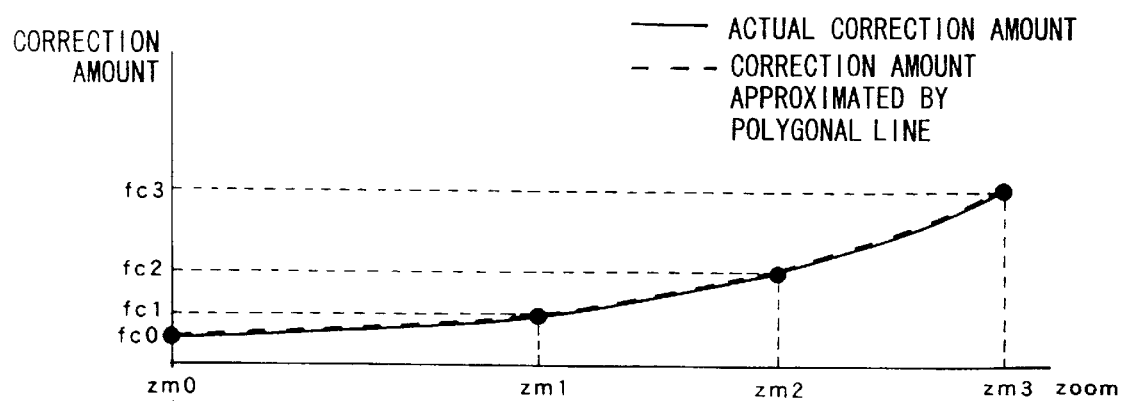
FIG. 5 is a schematic diagram showing an example of a correction amount of a focusing position which is caused due to the insertion and removal of the filter and an example of a polygonal line approximation.

An example of the polygonal line approximation will be more specifically explained with reference to FIG. 5. In FIG. 5, with respect to four zooming positions zm0, zm1, zm2, and zm3 (these positions are referred to as basic zooming positions), correction amounts fc0, fc1, fc2, fc3, and fc4 which are necessary to obtain an in-focus state when the filter is inserted are obtained by actual measurement, with respect to an arbitrary (namely, other than the basic zooming positions) zooming position, a correction amount which is needed to obtain the in-focus state when the filter is inserted by the polygonal line approximation based on those data is shown.

That is, the actual correction amount (shown by using a solid line in FIG. 5) in case of inserting the filter at an arbitrary zooming position is approximated by a polygonal line which is obtained by linearly sequentially connecting four points (zm0, fc0), (zm1, fc1), (zm2, fc2), and (zm3, fc3). The correction amount at the arbitrary zooming position is read from the polygonal line. The read correction amount is added to the focusing position which is calculated in accordance with the stored zoom tracking curve data on the basis of the zooming position, thereby correcting the focusing position. As shown in FIG. 5, since the approximation by the polygonal line has an enough high precision, the control of the focusing position in which no out-of-focus is caused or its degree is sufficiently small can be performed.

In FIG. 5, the four basic zooming positions and the correction amounts at those positions have previously been stored. However, generally, in the case where (N+1) basic zooming positions zm0, zm1, ..., zm(N) and correction amounts fc0, fc1, ..., fc(N) at those positions have been stored, with respect to an arbitrary zooming position $zm_x$, a correction amount $fc_x$ at such a position can be calculated by a calculation as shown in the following equation.

$$fc_x = \frac{(zm_x - zm(M)) \times (fc(M+1) - fc(M))}{zm(M+1) - zm(M)} + fc(M) \quad (1)$$

where, $zm(M) \leq zm_x < zm(M+1)$
(M and M+1 satisfy $0 \leq M < M+1 \leq N$)).

By performing the focusing position control on the basis of the correction amount $fc_x$ obtained as mentioned above, the correct in-focus state can be obtained. Further, now assuming that zm0 is set to a wider angle end and zm3 is set to a telescopic end, in order to perform a focusing position correction, it is sufficient to merely store total six data comprising two zooming positions and four focusing positions together with the zoom tracking curve data. Consequently, an amount of data to be stored can be reduced as compared with the case of storing the data of two zoom tracking curves.

Although the case of using the four basic zooming positions has been described here, it is generally sufficient to use basic zooming positions of the number that is necessary for the polygonal line approximation to have an enough precision. More specifically speaking, it is sufficient to decide the number of basic zooming positions so that the correction error amount, namely, a difference between the actual correction amount and the correction amount calculated by the polygonal line approximation lies within a depth of focus.

Figure 6:
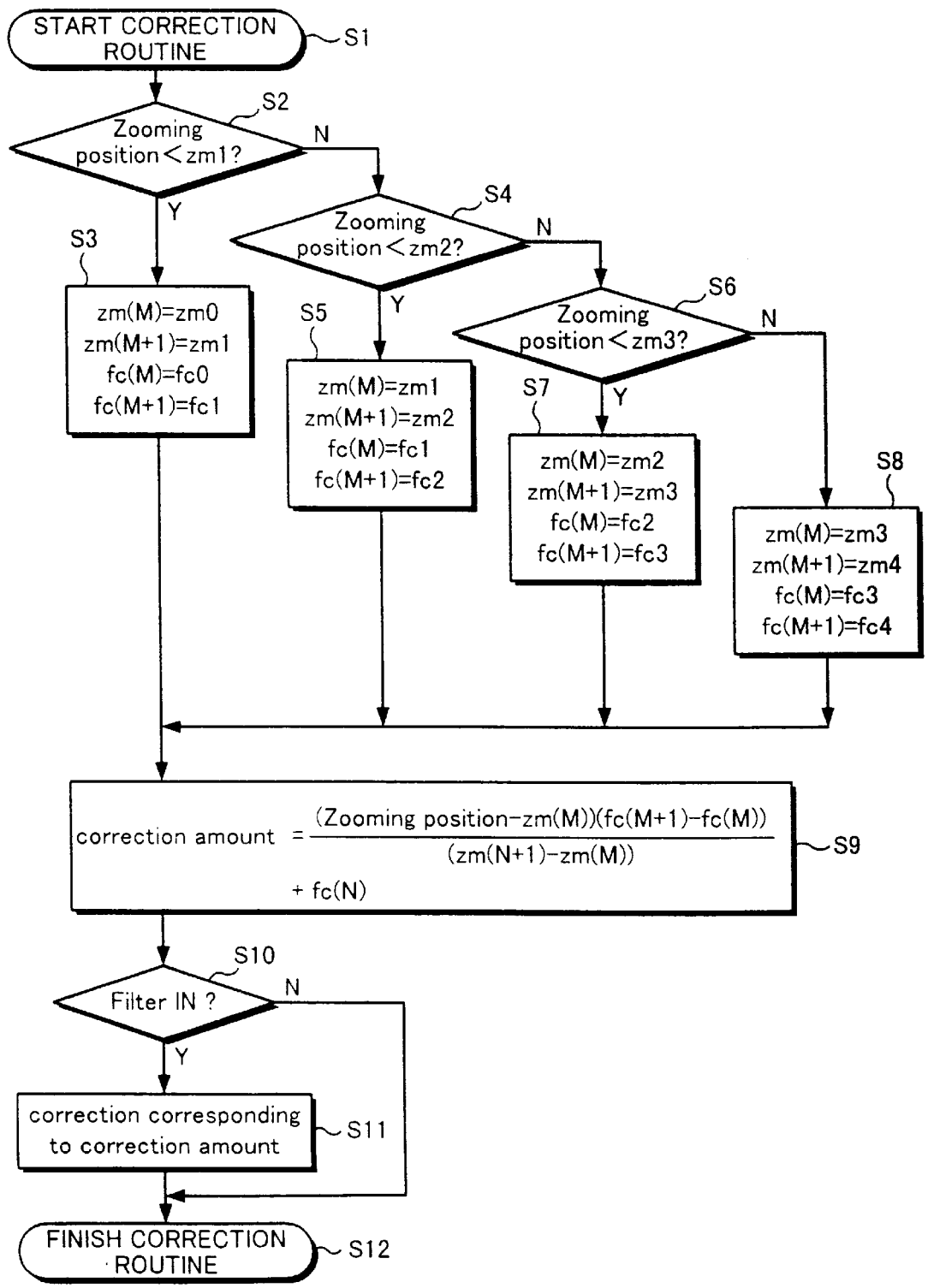
FIG. 6 is a flowchart showing an example of a correcting routine of the focusing position.

A correcting method when the filter is inserted will now be described with reference to a flowchart of FIG. 6. As basic zooming positions, zm0, zm1, zm2, zm3, and zm4 are used, zm0 is set to the wider angle end, and zm4 is set to the telescopic end. A correcting routine is started in step S1. In step S2, a check is made to see if the zooming position at the time of starting is located on the wider angle side than zm1. When the zooming position at the start of the correcting routine exists on the wider angle side than zm1, step S3 follows. In the other cases, step S4 follows.

In step S3, the values of zm0, zm1, fc0, and fc1 are held in a temporary RAM as memory means and step S9 follows. As will be explained hereinlater, in step S9, a calculation of a correction amount by the polygonal line approximation is executed in accordance with the equation (1).

In step S4, a check is made to see if the zooming position at the start of the correcting routine exists on the wider angle side than zm2. When the zooming position at the start of the correcting routine exists on the wider angle side than zm2, step S5 follows. In the other cases, step S6 follows. In step S5, the values of zm1, zm2, fc1, and fc2 are held in the temporary RAM and step S9 follows.

In step S6, a check is made to see if the zooming position at the start of the correcting routine exists on the wider angle side than zm3. When the zooming position at the start of the correcting routine exists on the wider angle side than zm3, step S7 follows. In the other cases, step S8 follows. In step S7, the values of zm2, zm3, fc2, and fc3 are held in the temporary RAM and step S9 follows.

When the processing routine advances to step S8, since it has been decided that the zooming position at the start of the correcting routine exists between zm3 and zm4, in step S8, the values of zm3, zm4, fc3, and fc4 are held in the temporary RAM and step S9 follows.

When the processing routine advances to step S9, since the data to perform the calculation according to the equation (1) has been held in the temporary RAM, the correction amount is calculated in accordance with the equation (1) in step S9.

After that, step S10 follows. In step S10, a check is made to see if the filter has been inserted. When the filter is inserted, step S11 follows and the correction amount calculated in step S9 is added to the focusing position which is calculated in accordance with the stored zoom tracking curve data on the basis of the zooming position, thereby calculating the corrected focusing position. After that, step S12 follows and the correcting routine is finished. When the filter is not inserted, step S12 soon follows and the correcting routine is finished.

In the foregoing correcting routine, after the correction amount was calculated in step S9, whether the filter has been inserted or not is discriminated in step S10. However, it is also possible to start the procedure regarding the calculation of the correction amount after confirming the insertion of the filter.

The data which needs to be preliminarily stored in order to perform the control of the focusing position such as zoom tracking curve data, data regarding the correction in association with the insertion and removal of the filter at the several zooming positions, and the like can be also stored in the ROM in the CPU 36 or can be also stored into memory means such as an EEPROM (Electrically Erasable Programmable ROM) or the like in which storage contents can be easily changed. In the latter case, in the case where the lens or filter is exchanged or the like due to a reason such that the performance is changed or the like, the data which needs to be previously stored to calculate the correction amount can be easily changed.

Although the foregoing embodiment of the invention relates to the case where the invention is applied to the digital VCR integratedly having the image pickup apparatus, the lens control apparatus, lens control method, and image pickup apparatus according to the invention can be also applied to any other image pickup apparatuses using the lens system having the focusing lens and the zooming lens and to recording apparatuses of video information each using such an image pickup apparatus as a component element.

As mentioned above, according to the invention, for example, the zoom tracking curve data when the filter is removed is stored and, further, the correction amounts of the focusing positions which are needed to eliminate the out-of-focus which is caused when the filter is inserted are obtained as, for instance, actual measurement values with regard to a predetermined number of zooming positions, and the results are stored. The correction amount when the filter is inserted at an arbitrary zooming position is calculated by the polygonal line approximation based on the data of the correction amounts. The calculated correction amount is added to the focusing position which is obtained on the basis of the stored zoom tracking curve data, thereby controlling the focusing position so as to obtain the correct in-focus state with respect to an arbitrary zooming position even in the case where the filer is inserted.

Therefore, the amount of data which needs to be previously stored can be reduced as compared with the case of storing both of the zoom tracking curve data when the filter is inserted and the zoom tracking curve data when the filter is removed.

Therefore, since it is unnecessary to have the memory means of a large capacity, the out-of-focus due to the insertion and removal of the filter can be prevented without being accompanied with the increase in circuit construction scale. The data can be also easily rewritten as necessary.

Further, the calculating routine can be made easier as compared with the case where both of the zoom tracking curve data when the filter is inserted and the zoom tracking curve data when the filter is removed are previously stored and the focusing position control is performed by switching them in accordance with a situation. The calculating routine can be also easily changed as necessary.

For example, as for the filter in which a variation of the characteristics is large due to, for example, a circumstance of the manufacturing process or the like, it is difficult to unconditionally obtain at a high precision the zoom tracking curve data when the filter is inserted by the simulation or the like. With respect to such a filter, it is difficult to store the zoom tracking curve data in the filter inserted state and to perform the focusing position control at an enough precision on the basis of the stored zoom tracking curve data. According to the invention, even in such a case, in a state where each filter is installed to each mass producing apparatus, the data of the correction amounts regarding several zooming positions is obtained, and this data is stored together with the zoom tracking curve data when the filter is removed into the memory means in the mass producing apparatus which collected the data. Thus, even in any one of the case where the filter is removed and the case where the filter is inserted, the correct in-focus state can be set.

The present invention is not limited to the foregoing embodiment but many modifications and variations are possible within the spirit and scope of the appended claims of the invention.

What is claimed is:

1. A lens control apparatus having a focusing lens and a zoom lens and constructed so as to insert and remove a filter into/from an optical path, comprising:

memory means for storing a plurality of zoom tracking curve data for expressing a relation between a zoom lens position and a focusing lens position when an in-focus state is obtained at said zoom lens position in a first state regarding the insertion and removal of said filter;

lens position driving means for driving said zoom lens position and said focusing lens position, respectively; and control means for controlling said lens position driving means so as to eliminate an out-of-focus which is caused when the apparatus is shifted to a second state regarding the insertion and removal of said filter at the focusing lens position which is obtained from said zoom tracking curve data in correspondence to an arbitrary position of said zoom lens.

2. An apparatus according to claim 1, wherein said control means stores correction data regarding the correction of the focusing lens position when said out-of-focus is eliminated and an in-focus state is set with regard to a predetermined number of zoom lens positions in said second state regarding the insertion and removal of said filter, and calculates an amount of correction to be performed to eliminate said out-of-focus and set the in-focus state for the lens position which is obtained from said zoom tracking curve data with regard to an arbitrary position of said zoom lens in said second state regarding the insertion and removal of said filter by a polygonal line approximation based on said correction data.

3. A lens control apparatus according to claim 1, wherein said first state regarding the insertion and removal of said filter is a state where said filter is removed, and said second state regarding the insertion and removal of said filter is a state where said filter is inserted.

4. A lens control apparatus according to claim 1, wherein said first state regarding the insertion and removal of said filter is a state where said filter is inserted, and said second state regarding the insertion and removal of said filter is a state where said filter is removed.

5. An image pickup apparatus comprising:

a lens control apparatus having a focusing lens and a zoom lens and constructed so as to insert and remove a filter into/from an optical path, said lens control apparatus being constructed by memory means for storing a plurality of zoom tracking curve data for expressing a relation between a zoom lens position and a focusing lens position when an in-focus state is obtained at said zoom lens position in a first state regarding the insertion and removal of the filter, lens position driving means for driving said zoom lens position and said focusing lens position, respectively, and control means for controlling said lens position driving means so as to eliminate an out-of-focus which is caused when the apparatus is shifted to a second state regarding the insertion and removal of said filter at said focusing lens position which is obtained from said zoom tracking curve data in correspondence to an arbitrary position of said zoom lens;

an image pickup device to which light is inputted through said focusing lens and said zoom lens; and signal processing means for executing a signal process to an image pickup output from said image pickup device.

6. An image pickup apparatus according to claim 5, wherein said first state regarding the insertion and removal of said filter is a state where said filter is removed, and said second state regarding the insertion and removal of said filter is a state where said filter is inserted.

7. An image pickup apparatus according to claim 5, wherein said first state regarding the insertion and removal of said filter is a state where said filter is inserted, and said second state regarding the insertion and removal of said filter is a state where said filter is removed.

8. A lens control method in a lens control apparatus having a focusing lens and a zoom lens and constructed so as to insert and remove a filter into/from an optical path, comprising:

a step of storing a plurality of zoom tracking curve data for expressing a relation between a zoom lens position and a focusing lens position when an in-focus state is obtained at said zoom lens position in a first state regarding the insertion and removal of said filter;

a lens position driving step of driving said zoom lens position and said focusing lens position, respectively; and a step of controlling said lens position driving step so as to eliminate an out-of-focus which is caused when the apparatus is shifted to a second state regarding the insertion and removal of said filter at the focusing lens position which is obtained from said zoom tracking curve data in correspondence to an arbitrary position of said zoom lens.

9. A lens control method according to claim 8, wherein said first state regarding the insertion and removal of said filter is a state where said filter is removed, and said second state regarding the insertion and removal of said filter is a state where said filter is inserted.

10. A lens control method according to claim 8, wherein said first state regarding the insertion and removal of said filter is a state where said filter is inserted, and said second state regarding the insertion and removal of said filter is a state where said filter is removed.

* * * * *